United States Patent
Bogdahn

[11] Patent Number: 6,148,773
[45] Date of Patent: Nov. 21, 2000

[54] BRAKE LOCK MECHANISM FOR ANIMAL LEASH ASSEMBLY

[75] Inventor: Manfred Bogdahn, Hamburg, Germany

[73] Assignee: Flexi-Bogdahn Technik GmbH & Co. KG, Germany

[21] Appl. No.: 09/263,880

[22] Filed: Mar. 8, 1999

[30] Foreign Application Priority Data

Mar. 9, 1998 [DE] Germany ............... 298 04 615 U

[51] Int. Cl.[7] ................................................. A01K 27/00
[52] U.S. Cl. ........................................... 119/796; 119/794
[58] Field of Search ................................... 119/794, 796, 119/797, 798; 242/223, 243, 283, 285, 291; 188/382

[56] References Cited

U.S. PATENT DOCUMENTS

| | | | |
|---|---|---|---|
| 3,937,418 | 2/1976 | Critelli ............................. | 119/796 |
| 4,328,766 | 5/1982 | Deibert ............................. | 119/794 |
| 4,501,230 | 2/1985 | Talo ................................. | 119/796 |
| 4,562,792 | 1/1986 | Pak et al. ......................... | 119/797 |
| 5,483,926 | 1/1996 | Bogdahn ........................... | 119/796 |
| 5,890,456 | 4/1999 | Tancrede .......................... | 119/794 |

FOREIGN PATENT DOCUMENTS

| | | |
|---|---|---|
| 78 28 193 U | 9/1978 | Germany . |
| 84 10 346 U | 3/1984 | Germany . |
| 93 04 693 U | 7/1993 | Germany . |

*Primary Examiner*—Peter M. Poon
*Assistant Examiner*—Elizabeth Shaw
*Attorney, Agent, or Firm*—Howson and Howson

[57] ABSTRACT

A retractable animal leash assembly including a housing suitable for being held in one hand is disclosed, with a freely moveable, but, if desired, lockable leash being arranged partially coiled within the housing, this housing mounting a brake key operable by the holding hand for momentarily blocking the portion of the leash located outside the holding at a desired length with a brake lock mechanism for holding the brake key in the locking position. This brake lock mechanism comprises a two-armed lever arranged to be moved between two positions on the housing reachable by the same finger/thumb of the holding hand, the handling of this pivoted lever occurring in an ergonomically optimal manner.

17 Claims, 1 Drawing Sheet

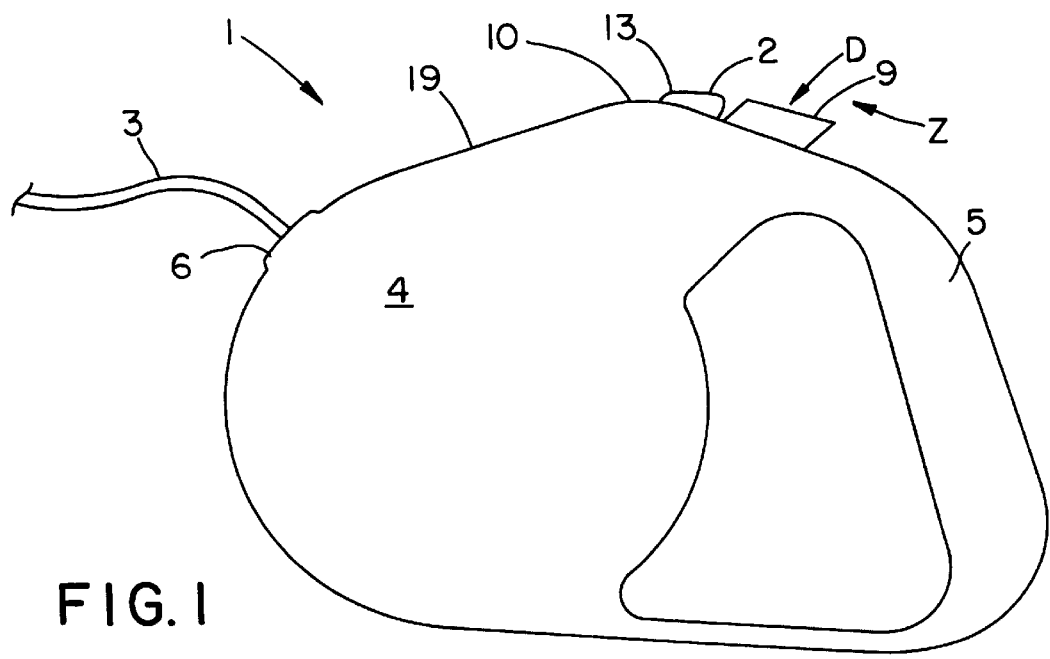
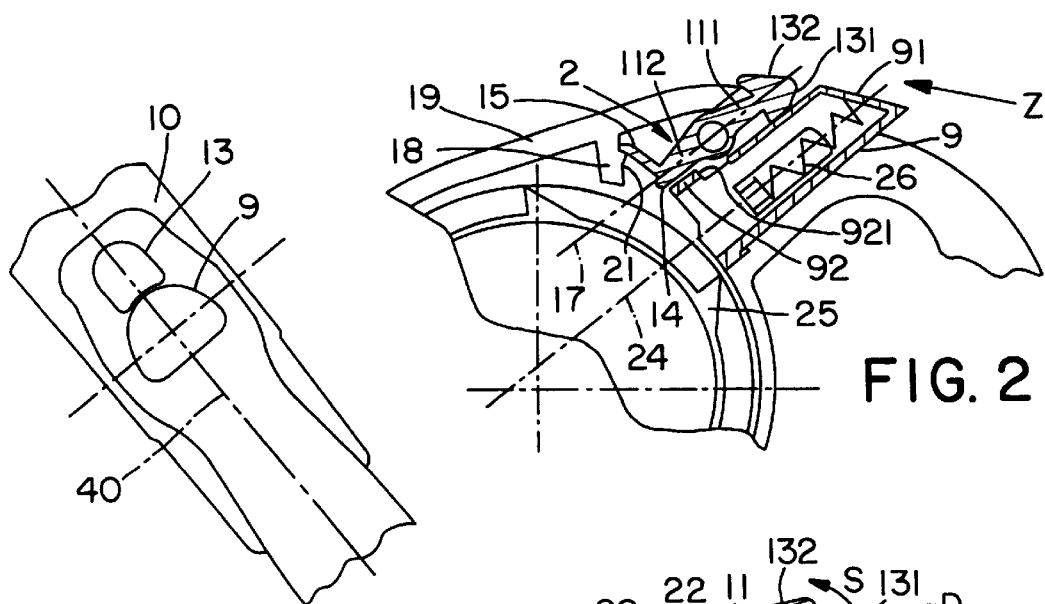
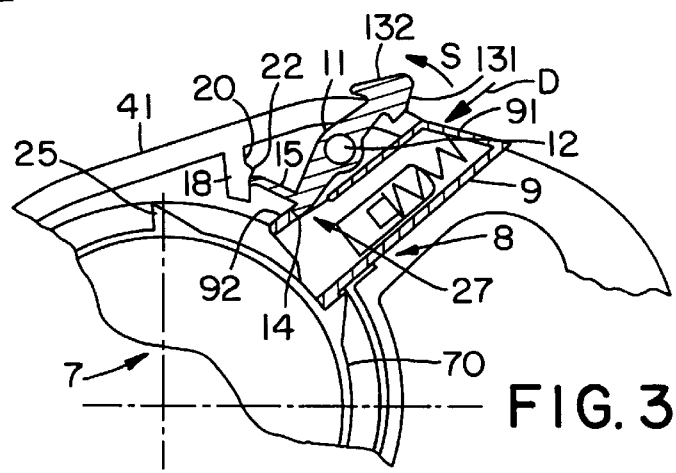

BRAKE LOCK MECHANISM FOR ANIMAL LEASH ASSEMBLY

BACKGROUND OF THE INVENTION

1. Field of the Invention

The invention concerns a portable, retractable animal leash assembly, wherein said leash line is arranged on a wind-up spool mounted to rotate in a housing carried in the hand. The assembly includes a brake having brake activation means operable by the carrying hand to stop the portion of said leash line wound off the spool located outside the housing at a desired length and a brake lock mechanism being associated with the leash in the region of the brake to lock the leash in the position momentarily determined by the brake. The brake lock mechanism includes operating means separated from said brake activation, but both being arranged such that the used may operate them with one and the same hand, with the lock operating means being arranged behind the brake operating means when seen in the gripping direction of the carrying hand.

2. Prior Art

In a known leash assembly of this type as shown in German Utility Model Publication 78 28 193 the locking mechanism for the brake key is designed as a locking catch in a position which, when seen from the person using the leash, is arranged behind the brake key, which means that it is positioned between this key and the exit opening in the housing for the passage of the leash. The brake key as well as the brake key locking mechanism can be operated with the hand holding the housing. However, it is particularly disadvantageous that the locking mechanism for locking the pressed-down brake key must be moved towards the brake key, which means it must be moved against the gripping direction towards the ball of the thumb of the user's hand. The different kinds and directions of movement of the elements to be operated, namely the pressing-down of the brake key, on the one hand, and the pulling of the brake key locking mechanism, on the other, often lead to irritations with the using person about the function of the operating elements and impede the use of the lead with one hand only, particularly with the thumb of one hand. Such handling is impeded even further by the fact that in this structure the lock operating element comes to lie sunk behind the brake key. Beyond that, it has shown to be most unsatisfactory to have to release the locking of the brake key by activating the latter, since this releasing may also occur in the case of unintended activation. Also, the expenditure in manufacture is relatively large for a lock catch of the known design, particularly regarding the undercut for the catch tappet and for mounting the lock catch.

In another known leash assembly having a separate arrangement of the brake key and the brake key locking mechanism the operation elements are placed spaced to each other in areas of the housing which are unfavourable with regard to ergonomic aspects of the hand (see German Utility Model Publication 84 10 346). This leads to maloperations and malfunctions particularly under stress and thus in situations in which normally a particularly faultless and quick operation is required. In many cases the second hand must thus be used to safeguard correct operation which impedes quick action and safe handling in many a situation. German Utility Model 93 04 693 corresponding to U.S. Pat. No. 5,483,926 shows a leash assembly which has been improved with regard to one-hand-handling. By arranging two lateral handling elements the operation between the functional states is nevertheless impaired. Moreover, the mechanism of this assembly is rather expensive due to the relatively large number of component parts.

OBJECTS OF THE INVENTION

It is, therefore, a main object of the invention to overcome such prior art drawbacks and to suggest an improved leash assembly with locking means for the brake means or brake key arranged separately of the latter.

It is a further object of the present invention to provide a leash assembly of that type which can be comfortably and easily handled with one hand in a manner safeguarding proper operation.

It is yet a further object of the present invention to suggest a leash assembly which is simple in structure and can be produced in a cost-saving manner.

SUMMARY OF THE INVENTION

In an animal leash assembly comprising a hand-carried housing, a leash arranged therein to be retractable and having a free end portion extending out of this housing, brake means for stopping a portion of the leash located outside of the housing at a desired length by the carrying hand, and a locking mechanism for the brake means for providing a sustained or lasting brake function and including a pivoted member engaging the brake means, the brake lock mechanism being arranged behind the brake means when seen in the gripping direction of the carrying hand on the housing with the brake means and the brake lock mechanism being operable by the carrying hand at one time, the above objects are achieved in that the pivoted member of the brake locking mechanism is formed as a two-armed pivoted lever mounted to swivel or rock in the housing, that a first arm of the pivoted lever is provided with an operating portion and a second arm of the pivoted lever is provided with a locking portion for engaging the brake means, that the brake means is provided with a catch for receiving the locking portion, and that the first arm of the pivoted lever is mounted such that by pivoting it in a direction away from the brake means the locking portion will be received by the catch to form a lasting locking position for the brake means, on the one hand, and that by pivoting the first arm in the opposite direction the lasting locking position will be released, on the other. Due to the design and arrangement of the assembly according to the invention the operation element or operating portion of the locking mechanism is provided in the handling area of the brake means advantageously designed and realized as a brake key such that together with this it can be operated in a practically uniform operation. This can be done one-handedly with the same finger, normally the thumb, first pressing the brake key and then moving the lock operation element by natural continuation of the finger movement, namely by pushing forward the finger or thumb in the direction of the front side of the assembly, whereby the state or position of the brake key is locked lastingly. In this position, in which the lock operation element remains in the gripping area of the finger or thumb it has to be moved backwardly against the advance direction of the finger in order to release the brake key once more. Thus, a safe operation done at quick reaction without any irritation about the locking function, on the one hand, and the brake key function, on the other, may be guaranteed. The double-armed locking pivoted lever enables a simple locking connection or engagement with the brake key so that it is possible to obtain a locking system which only affords a small number of component parts and can be produced at low cost and with the aim of safeguarding simple structure and manufacture. Inside the brake means or rather, preferably inside the brake key a compression (coil) spring may be provided to cause a biasing force against the braking force applied by the user to return the brake key into its initial or rest position once said braking force is no longer applied.

According to a particularly advantageous embodiment of the present invention the pivoted lever is connected to or associated with a web for supporting or defining the position thereof on the housing in the locked and/or released position of its locking portion. Thus, the locking positions are additionally secured, and the handling sensibility is improved insofar as the person handling the leash has, in the locked position, to work against a specifically defined locking resistance. Expediently, the web may be designed as a resilient support element in the form of a so-called spring web, which works against a resilient biasing force. It is advantageous to associate the free end of such web means with a locking threshold formed on the housing. This is a particularly simple means for obtaining an effective co-operation with the free end of the web. Preferably, the spring web as well as the pivoted lever, preferably in its entirety, are made from plastic material.

It is also advantageous to design both arms of the pivot lever such that they have essentially equal effective lengths. This does not only help to obtain a rather favourable mounting position of the lever immediately next to the brake key, but the swivelling and thus operational path of the lock handling element by way of a part-circular movement about the pivot axis can be made relatively small without affecting the engagement effect of the locking element on the brake key.

Expediently, the operating portion of the pivoted lever may be formed with a head whose cross-section is wedge-shaped and which has a front operating face when seen in the gripping direction, projects beyond the operating face of the brake key when this is pressed down into its brake position. Thus, comfort and security with regard to operation of the assembly may be improved even further. In particular, the thumb of the operating hand may remain resting on the operating face of the brake key when the front face of the operating head is pushed forward. The operating hand will easily sense the operating head projecting from the upper side of the leash housing so that the operating state of the leash assembly can be easily detected due to simple touching with the hand or fingers and without having to pay specific visual attention. Furthermore, the front face of the operating head and the rear face thereof which is on the opposite side of the brake key offer operating faces which are arranged and aligned in a particular favourable manner.

A further advantageous embodiment of the invention provides for the brake key to lie slideably against at least one pivoted lever portion when the pivoted lever is not locked. In this way, the pivoted lever is position-defined without essential looseness in the pressing as well as in the pulling direction by means of a simple structure and arrangement. Moreover, the pivoting movement of the lever necessary for locking and/or releasing the locking element with regard to the brake key may be reduced considerably.

According to another very useful embodiment of the invention the catch can be arranged in the lower portion of the brake means/brake key on the side facing the lever. This especially leads to the lever engaging the brake key under favourable action of forces between the locking elements but safeguarding a reliable and easy releasing of the locking position. On the other hand, this also favours a positionally close arrangement of the lever with regard to the brake key which, at the same time, makes it possible to reduce the necessary pivoting movement of the lever.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

FIG. 1 shows a side elevation of a leash assembly embodiment according to the invention having a take-up/unwinding arrangement for an animal/dog leash;

FIG. 2 is a partial vertical cross-section through the upper part of an animal/dog leash assembly as represented in FIG. 1 showing a lock key locking device with released brake key;

FIG. 3 shows a similar cross-section as FIG. 2, however with pressed-down brake key in locked position; and FIG. 4 shows a top view of the operating elements in the state shown in FIG. 2.

DESCRIPTION OF THE PREFERRED EMBODIMENTS

A leash assembly 1 shown in FIG. 1 comprises a housing 4 with an integral handle 5 arranged in the rearward area of the assembly 1. When one wants to walk an animal such as a dog, the latter is connected, normally via a collar, to a leash 3 which extends through an exit opening 6 at the front side of the assembly. In the housing, the leash 3 is received and stored by means of a take-up roller device 7, which is associated with brake means exemplified by a brake device 8. This brake device comprises a brake key 9 which is biased by spring force and can be pressed towards the roller 7 against this biasing force. The brake key 9 is inclined to extend towards the rear from the upper side 10 of the housing 4. Its lower portion inside the housing 4 co-operates with a spool or ratchet wheel 70 forming the basic element of the take-up roller device and functioning, together with a non-shown spring charging the leash with a certain pull-back force, in a manner well-known in the art, so that this need not be described in greater detail in the context of the present invention. It should just be mentioned in brief that the lower end of the rod-shaped brake key 9, when pressed down as shown in FIG. 3, enters into the path of rotary movement of braking teeth 25 of the ratchet wheel 70, so that the unwinding of the leash may be stopped and locked. When no such stopping occurs, as is shown in the state reflected by FIG. 2, the leash 3 may roll off from the roller freely, with this roller being rotated against the biasing force of the above-mentioned leash charging spring so that an automatic winding up of the leash is equally possible.

As can be taken from the figures, a brake key locking mechanism 2 is arranged adjacent to the brake key 9. When seen in a direction according to arrow Z showing the engagement direction of the thumb or finger of the person handling the device, i.e. the gripping direction from the handle 5 when this is gripped by a non-shown person operating the device, the brake key locking mechanism 2 is arranged behind the brake key 9, that is between the brake key 9 and the exit opening 6.

The brake key locking mechanism 2 comprises a pivoted lever 11 defining two arms, namely a first pivoted arm 111 and a second pivoted arm 112, and being mounted inside the housing 4. To this end, the pivoted lever 11 is mounted on the housing 4 by means of a pivot 12 forming the axis of pivoting and being arranged essentially perpendicular to the assembly's main plane defined by the major surface of the housing 4. Expediently the pivot 12 is designed in one piece with one of the housing shelves 41 which are produced in a known per se manner by plastic moulding or the like. The first and second pivoted arms 111 and 112, respectively, extend from the pivot axis, with the free end of the first arm 111 carrying a lock operating element 13 and the second arm 112 being provided with a rounded edge forming a jut which is provided as a locking portion 14 for engaging a catch 27 designed on the brake key 9. The lever 11 extends in almost straight lines with its two arms 111, 112, the lengths of which are essentially equal.

The operating element 13 is formed by a head which is wedge-shaped when seen in cross-section and serves as an operating button. In each one of the shown states of activation the operating element 13 projects from the upper side 10 of the housing. As may be taken from FIGS. 1 and 2, the structure is particularly advantageous when, seen in the gripping direction Z, the rear operating face 132 is essentially at the same level as the operating face 91 of the brake key 9 in the non-activated state of brake key 9 and locking mechanism 2, whereas in this functional state the front operating face 131 of the operating element 13 remains hidden behind the brake key 9. Consequently, in this state the operating or handling surfaces 91 and 132 lie essentially flush in this state. As can be taken from FIG. 3, the front operating face 131 gains a position to project beyond the operating face 91 of the brake key 9 when the latter is pressed down for braking.

The free end of arm 112 is associated in one piece with a resilient web 15, briefly termed spring web in the following to express its function, which web forms a support and stop element on the side of the lever 11 opposite the brake key 9. The spring web 15 projects essentially perpendicular from this rear side of lever 11. A rib or protrusion 18 is formed inside the housing 4 in the region of the free end of the spring web 15. The protrusion 18 is formed integrally with the housing wall 19 and extends inwardly therefrom. It is provided with a raised element such as a stop threshold 22 which co-operates with the free end of the web 15, this threshold graduating into recesses, grooves or indentations 20, 21 at its sides. These recesses 20, 21 may be engaged by the resilient free end of the web 15 to be received therein for stopping and locking.

As already mentioned, the leash assembly 1 has been shown in a released state of the locking mechanism 2 in FIG. 2. In this free-wheeling state of the leash take-up roller 7 the brake key 9 and the pivoted lever 11 are in essentially parallel position such that the central axis 17 of pivoted lever 11 extends essentially parallel to the central axis 24 of brake key 9. The latter lies slideably against the operating element 13 with its side facing the lever 11, on the one hand, and, with a wall element 92 formed in the lower portion of brake key 9, against the plain sliding face of the second arm 112, on the other. In such position as shown by FIG. 2 the brake key 9 is out of engagement with the brake teeth 25 of the take-up roller device 7. The spring web 15 is locked into the upper recess 20 of the protrusion 18 so that the pivoted lever 11 is supported on the housing 4 in this position and is thus held in a particularly defined rest position.

In order to lock the leash 3 at a defined exit length, the brake key 9 has to be operated. To this end, the brake key 9 is pressed down in the direction of arrow D shown in FIG. 3 against the force of the bias spring 26 which is held between the upper inner face of the brake key 9 and a corresponding portion on the housing 4. Thus, the further reeling off of the leash 3 is stopped by engagement of the lower end of the brake key 9 with one of the brake teeth 25. Since the brake key 9 remains in a state to move back counter to the direction of arrow D once the pressure exerted by the thumb is reduced, a rolling up of the leash 3 as well as the further extraction of the leash from the assembly remain possible.

However, in certain situations it is desirable to obtain a permanent or lasting state of locking, in which the leash 3 is to be locked in a desired length without the brake key 9 having to be held pressed down by the force of the thumb or finger. To this end, the locking portion 14 can be locked in the catch 27 formed by a recess in the brake key 9 on the side facing the pivoted lever 11, by pivoting this lever 11 in a direction indicated by arrow S in FIG. 3 away from the brake key 9. In such a secured position of the brake key 9 the operating surface 91 of the brake key 9 lies essentially flush with the upper side 10 of the housing wall 19. The spring web 15 is latched in the lower indentation, recess or groove 21 of the protrusion 18 and supports the pivoted lever 11 on the housing 4 in such position. The bump or lock threshold 22 defines, in connection with the spring force of web 15, a defined switching threshold between the two switching states of FIGS. 2 and 3. The resiliency or spring force of web 15 can be easily defined by an appropriate selection of the material and/or by the dimension of the web. For releasing the brake 8 or the brake key locking mechanism 2 the pivoted lever 11 can be pivoted in a direction counter to arrow S towards the brake key 9.

The lock catch 27 of the brake key 9 is formed in the lower area of the latter engaging with the take-up roller device 7 and on the side of the brake key which faces the arm 112. Advantageously, the upper free edge 921 of the protruding or thickened wall element 92 is used, as is shown in FIGS. 2 and 3, to form the locking abutment of the lock catch 27 for the rounded edge 14 of the free end of the arm.

According to the invention and as can be taken from the shown embodiment, which by no means is to be understood to limit the scope of the invention, the operating elements are ergonomically well arranged such that a one-handed handling becomes possible, in particular a handling with one finger/thumb only. By arranging the operating elements symmetrically with regard to the main plane 40 of the housing at the upper side 10 thereof, a further major advantage is achieved in that the leash assembly 1 may be operated equally with the right hand as well as with the left hand.

What is claimed is:

1. An animal leash assembly, comprising:
   a housing capable of being carried in a hand,
   a leash arranged in said housing in a retractable manner and having a free end portion which extends out of said housing,
   brake means including brake activation means for holding said portion of said leash located outside said housing at a desired length, and
   a brake locking mechanism for providing a sustained brake function and including a pivoting member engaging said brake means, said brake locking mechanism being arranged behind said brake means when seen in the gripping direction of said housing, and separately from said brake means, with said brake means and said brake locking mechanism both being arranged so that both are capable of being operated by a carrying hand, wherein said pivoting member of said brake locking mechanism is formed as a pivotable two-armed pivoted lever mounted to pivot in said housing, a thus formed first arm of said pivoted lever is provided with an operating portion and a thus formed second arm of said pivoted lever is provided with a locking portion for engaging said brake means, said brake means is provided with catch means for receiving said locking portion, and said first arm of said pivoted lever is mounted such that by pivoting it in a direction away from said brake means said locking portion will be received by said catch means to form a lasting locking position for said brake means, on the one hand, and that by pivoting said first arm in the opposite direction said lasting locking position will be released, on the other.

2. A leash assembly as claimed in claim 1, wherein said pivoted lever is associated with web means for defining the position of said pivoting lever relative to said housing in at least one of the locking and released positions of said locking portion.

3. A leash assembly as claimed in claim 2, wherein said web means is designed as a spring web forming a resilient support element.

4. A leash assembly as claimed in claim 2, wherein said web means is provided on the second lever arm in the region of the free end thereof, and projects approximately at a right-angle from the side of the second lever arm opposite said brake means.

5. A leash assembly as claimed in claim 2, wherein said web means is formed in one piece with said second pivoted arm.

6. A leash assembly according to claim 2, wherein said web means is arranged to abut against a web-shaped protrusion of said housing.

7. A leash assembly as claimed in claim 2, wherein a free end of said web means is associated with a locking threshold formed on said housing.

8. A leash assembly as claimed in claim 1, wherein said brake means is designed as a brake key.

9. A leash assembly as claimed in claim 8, wherein a spring is arranged associated with said brake means to cause the biasing force thereon.

10. A leash assembly as claimed in claim 1, wherein said brake means is biased counter its braking direction.

11. A leash assembly according to claim 1, wherein said pivoted lever is mounted to pivot by means of a pivot formed on said housing.

12. A leash assembly according to claim 1, wherein both arms of the pivoted lever have essentially equal effective lengths.

13. A leash assembly as claimed in claim 1, wherein said pivoted lever forms an essentially linear extension with its said two arms.

14. A leash assembly according to claim 1, wherein said locking portion is formed by the free end of said second lever arm in the shape of a rounded edge.

15. A leash assembly according to claim 1, wherein said operating portion is formed by a cross-sectionally wedge-shaped head whose front operating surface, when seen in the gripping direction, projects beyond the operating surface of said braking means when the latter is pressed down to be in the braking position.

16. A leash assembly according to claim 1, wherein said brake means lies against at least one of said pivot arms in a slideable manner when said brake means is not in a locked position with said pivoted lever.

17. A leash assembly as claimed in claim 1, wherein said catch means of said brake means is formed in the lower region of said brake means on the side facing said pivoted lever.

\* \* \* \* \*